United States Patent [19]

Shibata

[11] Patent Number: 4,541,044

[45] Date of Patent: Sep. 10, 1985

[54] LOOP TRANSMISSION WITH BACK-UP POWER SUPPLY FOR THE INTERFACE

[75] Inventor: Takehiko Shibata, Kokubunji, Japan

[73] Assignee: Canon Kabushiki Kaisha, Tokyo, Japan

[21] Appl. No.: 646,035

[22] Filed: Aug. 30, 1984

Related U.S. Application Data

[63] Continuation of Ser. No. 433,044, Oct. 6, 1982.

[30] Foreign Application Priority Data

Apr. 23, 1981 [JP] Japan ............................... 56-61869

[51] Int. Cl.³ ............................................. G06F 15/16
[52] U.S. Cl. .................................................. 364/200
[58] Field of Search ..................... 364/200 MS File; 340/825.05; 370/86

[56] References Cited

U.S. PATENT DOCUMENTS

| 4,159,470 | 6/1979 | Strojny et al. ............... 340/147 SC |
| 4,195,351 | 3/1980 | Barner et al. ................... 364/900 |
| 4,207,598 | 6/1980 | Reich et al. ..................... 358/257 |
| 4,316,248 | 2/1982 | Retter ............................. 364/200 |
| 4,406,513 | 9/1983 | Raphael ........................ 350/96.16 |

FOREIGN PATENT DOCUMENTS

| 53-84503 | 7/1978 | Japan . |
| 55-93337 | 8/1979 | Japan . |
| 55-14844 | 9/1979 | Japan . |
| 55-67886 | 5/1980 | Japan . |

OTHER PUBLICATIONS

Raswon et al., "A Fiber Optical Relay for Bypassing Computer Network Repeaters", Optical Engineering, vol. 19, No. 4, pp. 628–629, Jul./Aug. 1980 Issue.

*Primary Examiner*—Raulfe B. Zache
*Attorney, Agent, or Firm*—Fitzpatrick, Cella, Harper & Scinto

[57] ABSTRACT

An information transmitting apparatus having plural terminal units connected in a loop-shaped transmission channel, in which the signal transmission is maintained even in the event of a failure of power supply to a terminal unit, by effective use of back-up power supply according to the state of function of terminal units.

6 Claims, 2 Drawing Figures

LOOP TRANSMISSION WITH BACK-UP POWER SUPPLY FOR THE INTERFACE

This application is a continuation of application Ser. No. 433,044 filed Oct. 6, 1982.

BACKGROUND OF THE INVENTION

1. Field of the Invention

The present invention relates to an information transmitting apparatus, and more particularly to such an apparatus for transmitting image information or the like through a transmission channel composed for example of optical fibers.

2. Description of the Prior Art

There are recently proposed various information transmitting systems for transmitting image information or the like between distant locations. A recent example of the channel for such transmission is optical fibers for achieving high-speed transmission and avoiding external perturbations. As an example of the applications of such system, there is known the so-called local area network for information transmission among plural locations within a limited area such as a building or a business facility.

In a so-called loop transmission system in which plural terminal units are connected as a loop, for example through optical fibers, the function of the entire system is ensured only when the electric power supplies at these terminal units are all turned on to energize all the interface units including the opto-electric (O/E) converters and electro-optical (E/O) converters. Stated differently, in case one of the terminal units is not operable, for example by a failure in the power supply thereto, by a failure in the terminal unit itself or because power has not been turned on for the terminal unit due to the absence of demand for using that terminal unit, the transmission of information is interrupted at such disabled terminal unit and the function of the entire system is therefore disabled.

Also there are known certain information transmitting systems in which each terminal unit is provided with a back-up power source for replacing the normal power supply in case of a failure therein. Such a terminal unit is designed to be energized by the back-up power source in case of a failure in the normal power supply. Such a back-up power source is generally controlled by the status of power supply to the corresponding terminal unit and may therefore be wasted even when power supply to said terminal unit is unnecessary.

SUMMARY OF THE INVENTION

In consideration of the foregoing, the object of the present invention is to provide a novel information transmitting apparatus constituting an information transmitting system for efficient information transmission.

Another object of the present invention is to provide an information transmitting apparatus in which the function of the transmitting system is not interrupted even when the power supply to a terminal unit is shut off, for example by the breakage of a power supply line, a failure in a power source or a turning off of the power supply unit.

Still another object of the present invention is to provide an information transmitting apparatus in which the state of power supply is varied according to the state of the function of terminal units.

Still another object of the present invention is to provide an information transmitting apparatus allowing efficient use of back-up power supplies to the terminal units.

The foregoing and still other objects of the present invention will become fully apparent from the following description.

DESCRIPTION OF THE PREFERRED EMBODIMENTS

Now the present invention will be clarified in detail by the following description to be taken in conjunction with the attached drawings.

Figure 1:
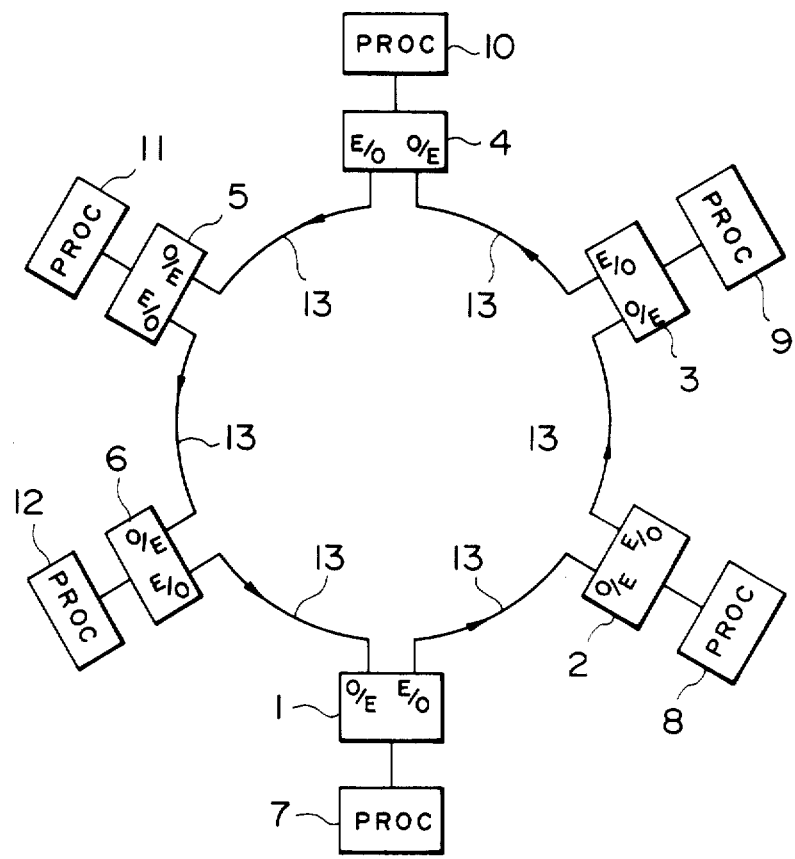
FIG. 1 is a schematic view of an optical transmission system composed of the information transmitting apparatus embodying the present invention.

FIG. 1 is a schematic view of an optical transmission system employing the information transmitting apparatus of the present invention, wherein six terminal units are mutually connected in a so-called loop shape through optical fibers. In the drawing there are shown interface circuits 1–6 respectively comprising O/E converters for converting optical signals into electric signals and E/O converters for converting electric signals into optical signals; signal processing units 7–12 such as computers, image reading units, image recording units or the like; and optical fibers 13. In the transmission system shown in FIG. 1, in case the power supply to a terminal unit not demanded for use is cut off, the power supply to the corresponding interface circuit is likewise interrupted. However, as long as at least one of other terminal units is powered and is in an operative state, a battery provided as the back-up power source for said operating terminal unit supplies power to the interface circuit of the unused terminal unit, so that the interface circuit is activated even though the corresponding signal processing unit remains inactive. In this manner the transmission of information is ensured without interruption at the unpowered terminal unit.

Figure 2:
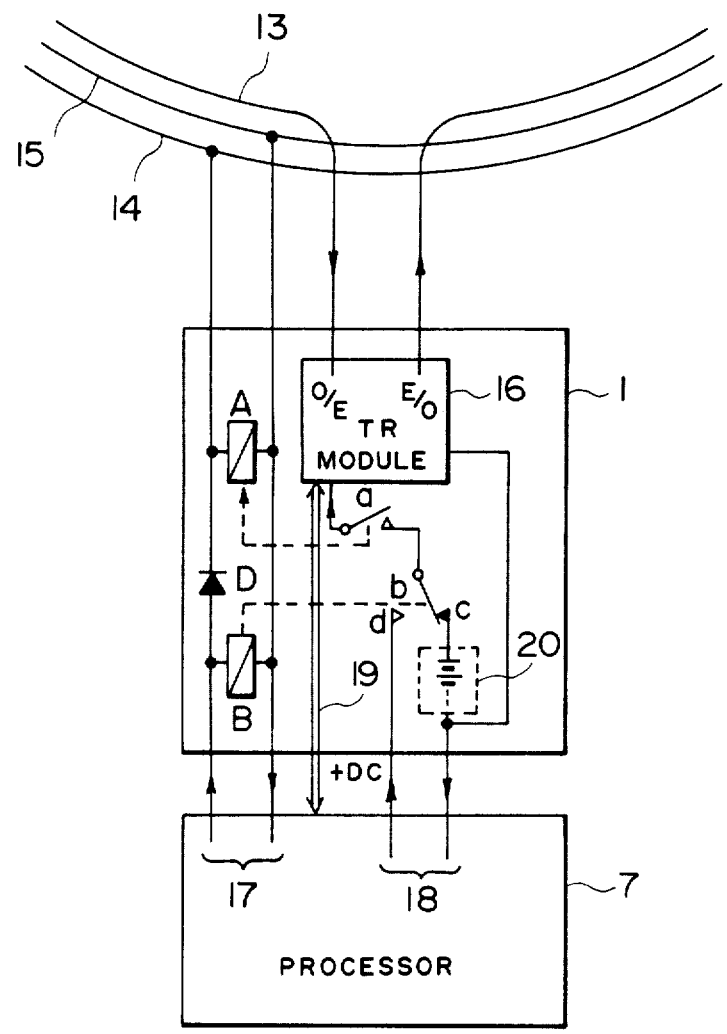
FIG. 2 is a partial detailed view of a portion of the system shown in FIG. 1.

FIG. 2 shows the details of an embodiment of the interface circuit shown in FIG. 1, wherein the same components as those in FIG. 1 are represented by same numbers. For the purpose of simplicity the following description will be limited to the interface circuit 1 and the signal processing unit 7, but other interface circuits 2–6 are constructed in the same manner as the circuit 1 shown in FIG. 2. Parallel to the optical fibers 13, there are provided two control lines 14, 15 for controlling the DC power supply to the interface circuits. The control lines 14, 15 may be composed for example of wires for use in a low-voltage equipment. There are also shown a transmitting-receiving module 16 including an O/E converter and an E/O converter; a relay A for closing a contact a when energized; a relay B for shifting a contactor b from a contact c to a contact d when energized; a diode D; relay drive lines 17 for DC power supply from the processing unit 7 in operation; interface power supply lines 18 for DC power supply from the processing unit 7 for driving the transmitting-receiving module 16 of the interface circuit 1; a signal line 19 for transmitting electric signals such as image information between the transmitting-receiving module 16 and the signal processing unit 7; and a battery 20 of a capacity sufficient for driving the interface circuit 1.

When a demand for use exists for the terminal unit shown in FIG. 2 and the signal processing unit 7 is powered for example through an unrepresented main switch, DC currents are supplied to the relay drive lines 17 and the interface power supply lines 18 from the processing unit 7. The power supply to the relay drive lines 17 can be made from a power source sufficient for energizing the relays. Consequently the relays A, B are energized to close the contact a and to shift the contactor b to the contact d. In this manner the transmitting-receiving module 16 is powered by DC power supply from the signal processing unit 7 through the relay contacts b, a, so that the terminal unit performs the desired signal processing and does not interrupt the transmission of information in the system. The power supplied to the relay drive lines 17 is also supplied to the control lines 14, 15.

On the other hand, in case the power supply to the signal processing unit 7 is not turned on due to the absence of demand for use for this terminal unit, the signal processing unit 7 does not supply DC currents to the relay drive lines 17 and the interface power supply lines 18. Consequently the relay B is not energized, and the contactor b remains in contact with c to prepare the module 16 for receiving power supply from the battery 20 through the contactor b and the contact a, but such power supply is not yet realized until the relay A is energized, since the contact a is normally open. However, in case a demand for transmission exists between other terminal units, for example between the signal processing units 9 and 12 shown in FIG. 1, and said other terminal units are accordingly powered, the relay A is energized by DC power supply from the signal processing units 9, 12 through the control lines 14, 15, thereby closing the relay contact a. Consequently the battery 20 supplies a DC current to the transmitting-receiving module 16 through the relay contacts b, c to activate module 16 although the signal processing unit 7 remains inactive. In this case the relay B is not energized by the power supply through the control lines 14, 15 because of the presence of the diode D. In the above-described manner the transmission system is not interrupted by the presence of a terminal unit not demanded for use as long as other terminal units are in an operative state, as the transmitting-receiving module 16 of the undemanded terminal unit is activated by power supply from the battery 20.

Also the use of separate DC power sources for driving the relays A, B and for driving the transmitting-receiving module 16 protects the optical transmission from electric noise.

The battery 20 may be a secondary battery, which can be recharged while the transmitting-receiving module 16 is powered by DC current from the signal processing unit 7.

Furthermore the relays A, B may be replaced by semi-conductor switching elements such as photocouplers for achieving equivalent functions with reduced power required in the relay drive lines 17 or in the control lines 14, 15.

As explained in detail in the foregoing, the present invention allows one to prevent the interruption of information transmission in the system, since each terminal unit can be powered by an incorporated battery according to the state of function of other terminal units, even when the first-mentioned terminal unit is not powered because of the absence of demand for its use, or is in failure for some reason, or is not powered because of a failure in the power supply in the location of said terminal unit.

Also the present invention avoids unnecessary waste of the battery power since the power supply to a terminal unit from the belonging battery is effected only when the normal power supply to said terminal unit is broken and when at least one (two or more in ordinary transmission of the information) of other terminal units is in operative state.

Although the foregoing embodiment has been limited to a transmission system in which terminal units are connected in a loop through optical fibers, the present invention is by no means limited to such embodiment but is applicable also for avoiding interruption of other systems caused by a power supply failure in a terminal unit therein.

I claim:

1. An information transmitting system comprising a plurality of terminals and an information transmitting channel for transmitting information between said terminals, wherein each of said terminals comprises:
   information processing means;
   an interface for connecting said information processing means with said information transmitting channel; and
   a back-up power source for initiating supply of electric power at the beginning of each period in which said information processing means is inoperative but the information processing means of another said terminal connected to said information transmitting channel is operative.

2. An information transmitting system according to claim 1, wherein said back-up power source of each said terminals is adapted to supply electric power to said interface.

3. An information transmitting system according to claim 1, wherein each said terminal further comprises first detecting means for detecting the function state of said information processing means and second detecting means for detecting the function state of said information processing means of another said terminal connected to said information transmitting channel, wherein said backup power source is adapted to supply electric power in response to said first and second detecting means.

4. An information transmitting system according to claim 1, wherein said information transmitting channel is of a loop-shaped configuration.

5. An information transmitting system according to claim 2, wherein said interface of one said terminal serves to transmit entered information to another said terminal connected to said information transmitting channel, when electric power is supplied by said back-up power source of said one terminal.

6. An information transmitting system according to claim 1, wherein said back-up power source of each said terminal is charged during operation of said information processing means of the respective said terminal.

* * * * *